April 18, 1939.   M. B. SULLIVAN   2,154,540
BUS SEAT SAFETY DEVICE
Filed May 7, 1937
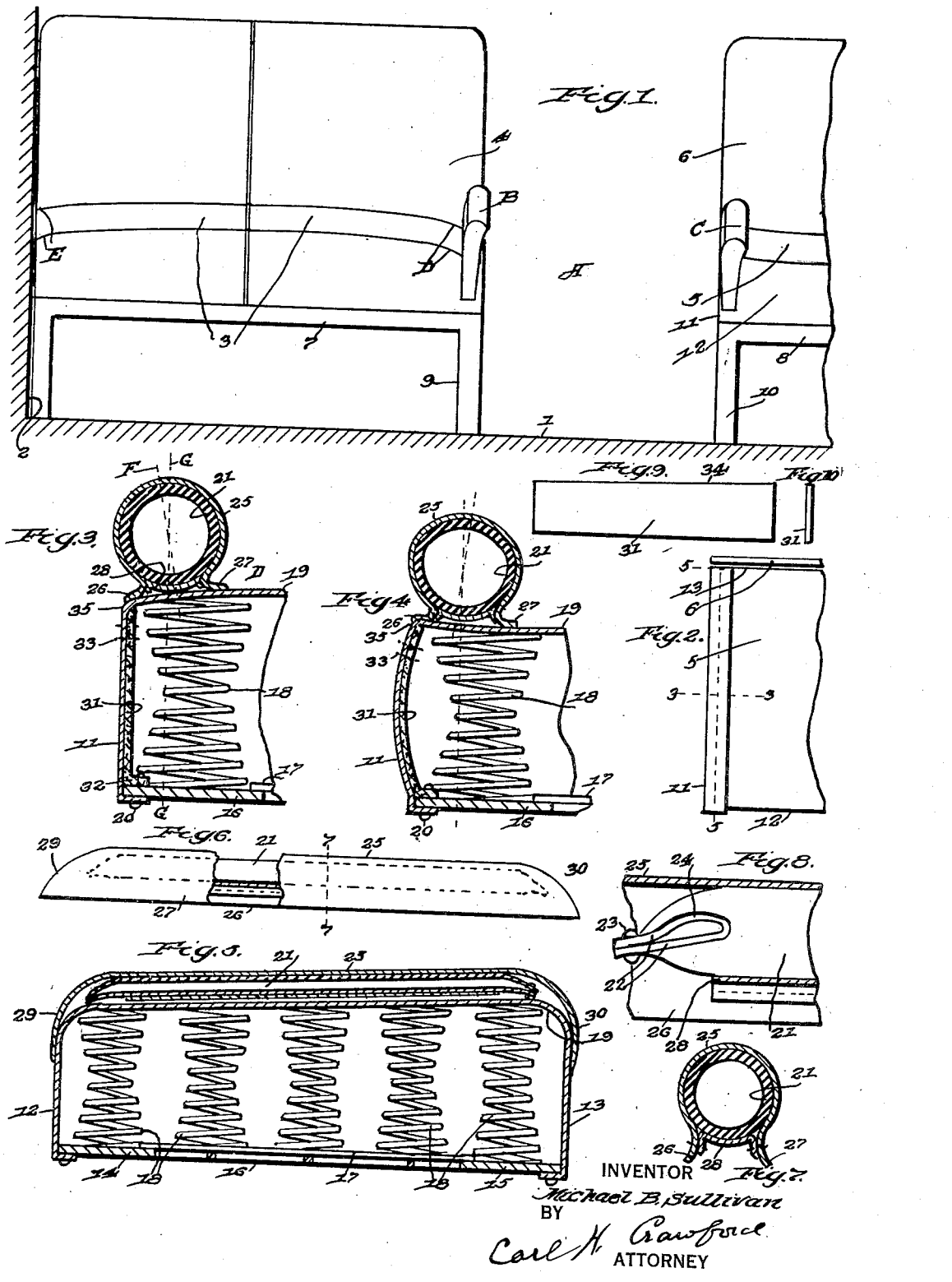

Patented Apr. 18, 1939

2,154,540

UNITED STATES PATENT OFFICE 2,154,540

BUS SEAT SAFETY DEVICE

Michael B. Sullivan, Spokane, Wash.

Application May 7, 1937, Serial No. 141,313

8 Claims. (Cl. 155—179)

The object of this invention is to provide a novel safety device to prevent seated passengers from accidentally slipping off from bus seats into the aisle when the bus is making sharp turns.

In many types of busses, especially city busses, economy of bus width necessitates a corresponding economy in the length of the transversely disposed passenger seats and there is not room enough for the high arms at the aisle ends of the seats with which through passenger cars and busses are usually equipped. Further, city busses have seats of leather along which the seated passenger easily slides and slips when the bus is rounding a curve, and hence the friction which plush or like material affords is not present. In the absence of some form of guard at the aisle end of these city bus seats, or at any aisle exposed edge of the seat, many accidents have occurred by reason of the fact that aisle occupants slide off from the ends of the seats and fall into the aisle when the bus makes sharp turns.

Therefore the problem involved in this invention was to make an effective aisle seat guard of low or shallow height, and one that would not injure a passenger if he suddenly seated himself on it instead of locating himself on the seat inside of the guard. Hence, it is a feature of this invention to provide a low elevation or shallow aisle seat guard extending along the aisle end of the seat in substantially parallel relation with the aisle.

It is a further feature to provide such a guard that will flex or yield under the weight of an occupant to prevent flesh injury to an occupant who suddenly seats himself, partly on the guard, instead of on the seat inside of the guard.

It is a further feature of the invention to provide a low or shallow flexible guard that normally tilts from the vertical toward the aisle when the seat is not occupied and which, due to the stress of occupancy, will be positively tilted toward and against the person of the occupant when the height of the latter has been imposed upon the seat, in order that the guard may be more effective in retaining the occupant against sliding off from the end of the seat.

A further feature of the invention resides in a seat sustaining and guard tilting buckling element which is so disposed in the aisle end of the seat as to coact effectively in resisting compression of the aisle seat end under the weight of an occupant in such a manner as to cause tilting movement of the guard without being in any manner mechanically or otherwise connected with the same.

The invention also resides in the improved guard as an article of manufacture.

The invention has other features and objects which will be more fully described in connection with the accompanying drawing and which will be more particularly pointed out in and by the appended claims:

In the drawing:

Fig. 1 is a transverse sectional view of a bus showing laterally disposed seats on opposite sides of an intervening aisle.

Fig. 2 is a plan view of one of the seats.

Fig. 3 is a sectional view on line 3—3 of Fig. 2, on an enlarged scale and showing the position of the guard when the seat is unoccupied.

Fig. 4 is a view similar to Fig. 3, showing the manner in which the guard is tilted inwardly when the weight of an occupant is imposed upon the seat.

Fig. 5 is a sectional view on line 5—5 of Fig. 2.

Fig. 6 is a view in side elevation, partly in section, of a completed guard before the same has been attached to a seat.

Fig. 7 is an enlarged sectional view on line 7—7 of Fig. 6.

Fig. 8 is a longitudinal sectional view showing how the inner member of the guard is altered near the end.

Fig. 9 is a side elevation of the seat supporting slab that is incorporated in the aisle end of the seat.

Fig. 10 is an end view thereof.

Like characters of reference designate similar parts throughout the different figures of the drawing.

In Fig. 1, of the drawing, I have shown in conventional form a cross section of a typical city bus looking toward the rear thereof, the floor being indicated at 1, and one side of the bus at 2. A central aisle is indicated at A, and on one side thereof I have shown a seat 3 with back 4 in full width, and on the opposite side a fragment 5 of a seat with the back at 6. Any type of supporting frames 7 and 8, with legs 9 and 10, may be used as far as this invention is concerned. For general reference purposes I will designate the seat guard on seat 3 at B, and that on seat 5 at C.

Reference will now be made to the specific form of guard shown in Figs. 3 to 8, and it will be understood that for convenience I will refer to guard C because the views are taken mostly from section lines on Fig. 2, and as the guards for all seats are identical in form and function, only one need be described in detail.

Hereinafter I shall refer to portion 11 as the aisle seat end, and the front and back of the seat will be designated by 12 and 13, respectively. The seat is of the spring type and the covering is leather or like material, and for purposes of this disclosure, the seat has a wood frame composed of front, back and end sections 14, 15 and 16, with a grid 17 mounted thereon to support the coil springs 18, of a conventional type. It will be understood that yielding seats for this service are rarely of the upholstered type. Without entering into detail it may be stated that the seat covering of leather or the like includes the seat portion proper, indicated at 19, which is supported by the springs 18, together with the aisle end 11, the front 12, and the rear 13, hereinbefore referred to, and which for illustrative purposes is sufficient. The end 11 is shown extending under frame section 16 and tacked or otherwise secured thereto at 20.

Reference will next be made to the specific construction of the guard device herein shown.

Although not essential to the invention, I have found it an advantage to make a guard of substantially cylindrical cross section and in the preferred construction, of a yielding nature, and in practice, I employ a length of rubber tubing 21 of the requisite length and recoiling resiliency, which may be termed the core or frame of the guard. At its ends, and to avoid an abrupt shoulder or terminal, the tube is longitudinally split and the split ends 22 are preferably riveted or otherwise connected at 23, in such a manner as to cause the connected split ends to droop or slope downwardly. This is accomplished by affording a degree of slack at 24 so that the connected split ends will normally take the position shown in Fig. 8. It will be noted that I avoid the necessity of an air inflated tube by employing one of a character having sufficient resiliency to recoil to normal because of its own strength. This tube will preferably be of sufficient length to form a low elevation or shallow guard having the rise shown for almost the depth of the aisle end of the seat, as will be later described.

The tube is provided with a casing 25 having an outer margin 26 suitably secured to the top 19 and end 11, as shown in Fig. 3, and an inner margin 27 suitably secured to the top seat covering 19. Between the margins 26 and 27 I employ a connecting strip 28 which is sewed or otherwise secured to said margins, as shown in Fig. 7, so that the tube is entirely enclosed, and more important, to assist in effecting the desired tilt of the guard, as will be later described. The connection of strip 28 with margins 26 and 27 may, and in practice is, reinforced with leather lacing, which is within the province of the invention although not shown, as it is deemed sufficient to show the strip 28 connected with the margins 26 and 27, to hold the casing tightly about the entire periphery of the tube 21.

The ends 29 and 30 of the casing 25 extend beyond the split ends of the tube 21, as shown in Fig. 5, and are secured to the front 12 and rear 13 of the seat in such a manner as gently and gradually to merge into the face of the same and present gradually reduced terminals for the guard.

In practically all spring seats the central portions bulge higher than the end portions due to the greater play afforded the springs and the fact that near the ends the springs cannot exert the same lift to the top covering 19, so therefore there is a downward slope at D and E when the seat is not occupied, which causes the guard to tilt outwardly toward the aisle as shown in Fig. 3, and as indicated by dotted line F, which is at an incline to the vertical line G, which intersects the longitudinal axis of the guard.

Reference will next be made to an improved seat end sustaining and buckling member which coacts with the guard and the seat top to tilt the guard inwardly to the Fig. 4 position.

As shown, the means employed for this purpose may consist of a length or slab of relatively heavy belting 31 which is of a sufficient length to extend substantially throughout the depth of the seat end 11, from front to rear, and which is shown bent at 32 and secured to the frame member 16. The upper part may be held by being sewed, as at 33, to the end 11, and the upper edge 34 is suitably inclined to correspond to the inclination of the seat top as shown in Fig. 5, so that this sustaining member has continuous engagement with the upper corner portion 35 of the seat. This sustaining member 31 is adapted to take compressive stress in its own plane, and will buckle transversely of its length as shown in Fig. 4. It will also be noted that this member 31 is located at one side, or toward the aisle, from the vertical line G, intersecting the axis of guard C.

It will be understood that the improved guard, as shown in Fig. 6, is considered and claimed as an article of manufacture, in addition to the claims for the combination. And it will also be clear that while I have shown the improved guard as applied to a previously constructed seat, that it may be incorporated in a seat when the latter is initially manufactured.

While the operation of my invention may be clear from the foregoing description, it will be briefly recapitulated as follows:

In the absence of the weight of an occupant, the guard, as shown in Fig. 3, will tilt from the vertical toward the aisle and will thereby afford that much more space to facilitate the user in seating himself, that is, a greater seat top area will be available. One reason why the guard C tilts toward the aisle is because of the inclined end portion D of the seat, and another reason is that the casing margins 26 and 27 are brought so close together by the connecting means or strip 28 that the outward tilt is greatly increased over what it would be if the margins 26 and 27 were spaced apart a distance equal to the diameter of tube 21. Therefore it is a feature of the invention to unite the margins 26 and 27 at a spaced distance substantially less than the exterior diameter of tube 21.

Now when a user seats himself just inside guard C, his weight will be imposed to the right of said guard, viewing Fig. 3, and also to the right of member 31. Hence, as shown in Fig. 1, the convex position of the seat top 19 will be changed to a concave position as indicated in seat 5. This will tension margin 27 and rock or tilt guard C to the right as shown in Fig. 4, thereby shifting the guard toward, and in most instances, against the person of the occupant. Such an inward tilting position would and does render the guard far more effective in preventing a person from sliding off the seat into the aisle A.

In this connection I desire to emphasize the accident preventative importance of tilting the guard inwardly because of the fact that the guard is of low elevation, as previously described; and to be most effective it should, because of its lack of height, occupy an inwardly, or at the very least, a vertical position.

Now because the weight of the aisle seated passenger is imposed so far inside the aisle end 11, the upper corner portion 35 will not descend as far as it would if the weight were imposed directly upon the extreme end of the seat. Hence, irrespective of the bending coefficient of the sustaining member 31, the latter will effectively resist depression of the extreme end 11, as far down as that area which directly supports the user's weight. Therefore, it will now be clear that member 31 coacts with the top 19 in causing the guard C to shift or tilt inwardly from the aisle end of the seat, by reason of the fact that it is disposed outwardly, or toward the aisle, from the vertical line G. If it were not for the sustaining resistance of member 31 the seat top 19 would be depressed to such an almost uniform extent that the tilting movement of guard C would be practically nil. Of course the weight of the occupant on the spring seat is such that it causes the member 31 to buckle, as shown in Fig. 4, but even with such yielding action the upper corner portion 35 is much higher than it would be without member 31. Further, it is a feature to employ a sustaining member 31, irrespective of the specific form shown, which will have such a coefficient of bending strength that it will be stiffer than the spring 18.

I also wish to point out the highly important safety factor which results from the fact that both the guard C and the stiffening member 31 are flexible. Suppose for instance that a passenger lost his balance and suddenly sat down directly upon guard C, instead of on the seat inside of said guard, then it will be clear, as shown in Fig. 4, that the guard C would yield and also member 31, and the user's flesh would not be bruised as would the case with an unyielding guard. Consequently, the accident preventing efficiency, which is the primary object of the invention, is very greatly enhanced by reason of the collapsible or yielding nature of the guard C, and yet the comfort of the passenger is not lessened.

With further reference to the yielding quality of the guard, it may be stated that it is not sufficiently yielding to compress by reason of any lateral shifting of the seated passenger against it, as that would not be necessary.

It will be also noted that the relatively light weight of a child would not be sufficient to buckle member 31, and hence with a reduced extent of seat compression, said member would take the compressive stress in the direction of its major plane. Therefore, it will be clear that the member 31 takes its stress in accordance with the amount of load imposed.

Prior to the adoption of this improved safety device the bus lines of Spokane, Washington, paid out thousands of dollars in damages by reason of accidents resulting from the causes herein described, and the statements made in support of the efficiency of this device are based upon successful performance in actual practice.

It will now be clear that the guard C and the slab 31 constitute safety mechanism located partly inside of and partly outside of the seat, the outside and inside portions of said mechanism being in such coacting relation to the seat as to shift the outside portion toward the occupant when the weight of the latter is imposed upon the seat.

It will also be clear that the means outside the guard C, which may be the slab 31, located nearest the aisle, acts in opposition to the weight of the occupant on the seat inside the guard.

While the device of this invention is primarily adapted to function as a safety device for the aisle exposed end of a bus seat, it is equally adapted for any aisle exposed edge of a bus seat where a safety factor is important. Therefore, whenever I have referred to the aisle end of the seat, I consider this to mean and include any aisle exposed edge of a bus seat.

It will be seen that it is a feature of the invention to accomplish the safety function with a guard of low elevation with respect to the seat top since a guard of high elevation would be obstructive to persons who might seat themselves hurriedly and not accurately, therefore, in the claims I shall refer to the guard as a low or shallow guard.

It is believed that my invention will be fully understood from the foregoing description, and while I have herein shown and described one specific form of the invention, I do not wish to be limited thereto except for such limitations as the claims may import.

I claim:

1. In an aisle safety device for transversely disposed bus passenger seats opposite an aisle, a yielding passenger seat extending from the bus side to the bus aisle and having an aisle end portion sloping downwardly toward the aisle end of said seat, a safety guard extending along said sloping portion parallel with the aisle end of said seat and composed of a tube of yielding material and a casing therefor having its outer margin secured to the aisle end of said seat and its inner margin secured to the seat top of said sloping portion whereby said guard will normally tilt outwardly toward the bus aisle when said seat is unoccupied, and a vertically disposed yieldable slab in said seat extending along the depth of the aisle end thereof and outside a vertical line intersecting the longitudinal axis of said guard and adapted to buckle under direct or seat loads and resist compressive stress in the direction of its own plane, whereby normal depression of said seat by an occupant inside said guard will tilt the latter inwardly toward the person of such occupant and act to prevent the latter from accidently sliding off the aisle end of said seat when the bus is making a sharp turn.

2. In an aisle safety device for transversely disposed bus passenger seats opposite an aisle, a yielding passenger seat extending from the bus side to the bus aisle and having an aisle end portion sloping downwardly toward the aisle end of the seat, a low safety guard extending along said sloping portion parallel with the aisle end of said seat and secured thereto and normally tilting outwardly toward the bus aisle when the seat is unoccupied, and yieldable means in said seat extending along the depth of the aisle end thereof and outside a vertical line intersecting said guard to resist compressive stress in its own plane and support the aisle end of said seat top, whereby normal depression of said seat by an occupant inside said guard will tilt the latter inwardly toward such occupant and act to prevent the latter from accidently sliding off the aisle end of said seat when the bus is making a sharp turn.

3. In an aisle safety device for transversely disposed bus passenger seats opposite an aisle, a yielding passenger seat extending from the bus side to the aisle, a low yielding safety guard extending along and parallel with the aisle end of said seat and secured thereto, and a vertically disposed yieldable slab in said seat at the aisle end thereof and disposed outside a vertical line intersecting the longitudinal center of said guard to yieldingly support the top of said seat near the aisle end thereof, whereby normal depression of said seat by an occupant inside said guard will tilt the latter inwardly toward such occupant and act to prevent the latter from accidently sliding off the aisle end of said seat when the bus makes a turn.

4. In an aisle safety device for bus passengers, a passenger seat, and a safety device for the aisle end of said seat comprising a compressible tube having split ends, and a casing enclosing said tube and having lateral margins secured to said seat and end margins extending over said split ends and secured to the front and back of said seat.

5. In an aisle safety device for transversely disposed bus seats opposite an aisle, a spring supported passenger seat having a safety guard secured thereto and extending along the aisle end of said seat, and a slab of yielding material in the aisle end of said seat for supporting the latter against depression equal to the depression of the seat inside said guard, the yielding coefficient of said slab being less than that of the springs supporting said seat.

6. A safety device for a passenger bus having an aisle and provided with a yielding passenger seat having an end exposed to the aisle, comprising a shiftable shallow safety guard secured to said seat and extending along the aisle exposed end thereof, and means in said seat for resisting depression of said seat outside said guard as the weight of an occupant inside said guard depresses said seat, whereby said guard will be shifted toward the occupant.

7. A safety device for a passenger bus having an aisle and provided with a yielding passenger seat having an end exposed to the aisle, comprising an elongated shallow safety guard secured to the seat along the aisle exposed end thereof, and means for resisting depression of said seat outside said guard as the weight of an occupant inside said guard depresses said seat, whereby the resulting action of said seat will shift said guard toward the occupant.

8. In a safety device, the combination with a passenger bus having an aisle, of a yielding passenger seat having an aisle exposed end, and safety mechanism for said seat having a seat end sustaining portion inside of said seat and a guard portion outside of said seat and said guard portion being disposed at the aisle exposed end of said seat, and said mechanism being in operative coactive relation with said yielding seat to shift said guard portion toward an occupant as the weight of the latter depresses said seat.

MICHAEL B. SULLIVAN.